US012124874B2

(12) United States Patent
Tekelioglu

(10) Patent No.: US 12,124,874 B2
(45) Date of Patent: *Oct. 22, 2024

(54) PIPELINE TASK VERIFICATION FOR A DATA PROCESSING PLATFORM

(71) Applicant: Palantir Technologies Inc., Denver, CO (US)

(72) Inventor: Kaan Tekelioglu, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/505,626

(22) Filed: Nov. 9, 2023

(65) Prior Publication Data

US 2024/0069967 A1 Feb. 29, 2024

Related U.S. Application Data

(63) Continuation of application No. 17/937,097, filed on Sep. 30, 2022, now Pat. No. 11,853,794, which is a
(Continued)

(30) Foreign Application Priority Data

Dec. 14, 2017 (GB) ..................... 1720823

(51) Int. Cl.
  *G06F 9/46* (2006.01)
  *G05B 15/02* (2006.01)
  (Continued)

(52) U.S. Cl.
  CPC ........... *G06F 9/4881* (2013.01); *G05B 15/02* (2013.01); *G06F 8/433* (2013.01); *G06F 9/3838* (2013.01);
  (Continued)

(58) Field of Classification Search
  CPC ...... G06F 9/4881; G06F 9/4494; G06F 9/451; G06F 8/433; G06F 9/3838; G06F 9/5072; G06F 2209/486; G05B 15/02
  See application file for complete search history.

(56) References Cited

U.S. PATENT DOCUMENTS 10,884,798 B2   1/2021   Tekelioglu
11,467,871 B2   10/2022  Tekelioglu
(Continued)

FOREIGN PATENT DOCUMENTS

EP    3502872         6/2019
WO    WO 2017/107055  6/2017

OTHER PUBLICATIONS

Official Communication for European Patent Application No. 18212272.1 dated May 24, 2019, 7 pages.
(Continued)

*Primary Examiner* — Gregory A Kessler
(74) *Attorney, Agent, or Firm* — Knobbe, Martens, Olson & Bear, LLP

(57) ABSTRACT

A pipeline task verification method and system is disclosed, and may use one or more processors. The method may comprise providing a data processing pipeline specification, wherein the data processing pipeline specification defines a plurality of data elements of a data processing pipeline. The method may further comprise identifying from the data processing pipeline specification one or more tasks defining a relationship between a first data element and a second data element. The method may further comprise receiving for a given task one or more data processing elements intended to receive the first data element and to produce the second data element. The method may further comprise verifying that the received one or more data processing elements receive
(Continued)

the first data element and produce the second data element according to the defined relationship.

16 Claims, 8 Drawing Sheets

Related U.S. Application Data continuation of application No. 17/106,748, filed on Nov. 30, 2020, now Pat. No. 11,467,871, which is a continuation of application No. 16/218,872, filed on Dec. 13, 2018, now Pat. No. 10,884,798.

(51) Int. Cl.
| | |
|---|---|
| *G06F 8/41* | (2018.01) |
| *G06F 9/38* | (2018.01) |
| *G06F 9/448* | (2018.01) |
| *G06F 9/451* | (2018.01) |
| *G06F 9/48* | (2006.01) |
| *G06F 9/50* | (2006.01) |

(52) U.S. Cl.
CPC ............ *G06F 9/4494* (2018.02); *G06F 9/451* (2018.02); *G06F 9/5072* (2013.01); *G06F 2209/486* (2013.01)

(56) References Cited

U.S. PATENT DOCUMENTS

| | | |
|---|---|---|
| 11,853,794 B2 | 12/2023 | Tekelioglu |
| 2013/0227573 A1 | 8/2013 | Morsi et al. |
| 2014/0229953 A1 | 8/2014 | Sevastiyanov et al. |
| 2014/0253573 A1 | 9/2014 | Rettig et al. |
| 2014/0282421 A1 | 9/2014 | Jubran et al. |
| 2014/0325521 A1 | 10/2014 | Li et al. |
| 2016/0275123 A1 | 9/2016 | Lin et al. |
| 2017/0075693 A1 | 3/2017 | Bishop et al. |

OTHER PUBLICATIONS

Official Communication for European Patent Application No. 18212272.1 dated Mar. 18, 2022, 7 pages.

| | |
|---|---|
| MyOrganization > MyProject > Suspicious_Customers | 270 |
| Description | |
| Find suspicious customers by linking suspicious accounts with customers table which has details | 272 |
| Dependencies | |
| ri.server.main.dataset.12345<br>ri.server.main.dataset.45678 | 274 |
| Languages | |
| sql, python, java | 276 |
| Columns | |
| customer_id, name, address | 278 |
| Column Type | |
| string, integer, date | 279 |

*Fig. 5*

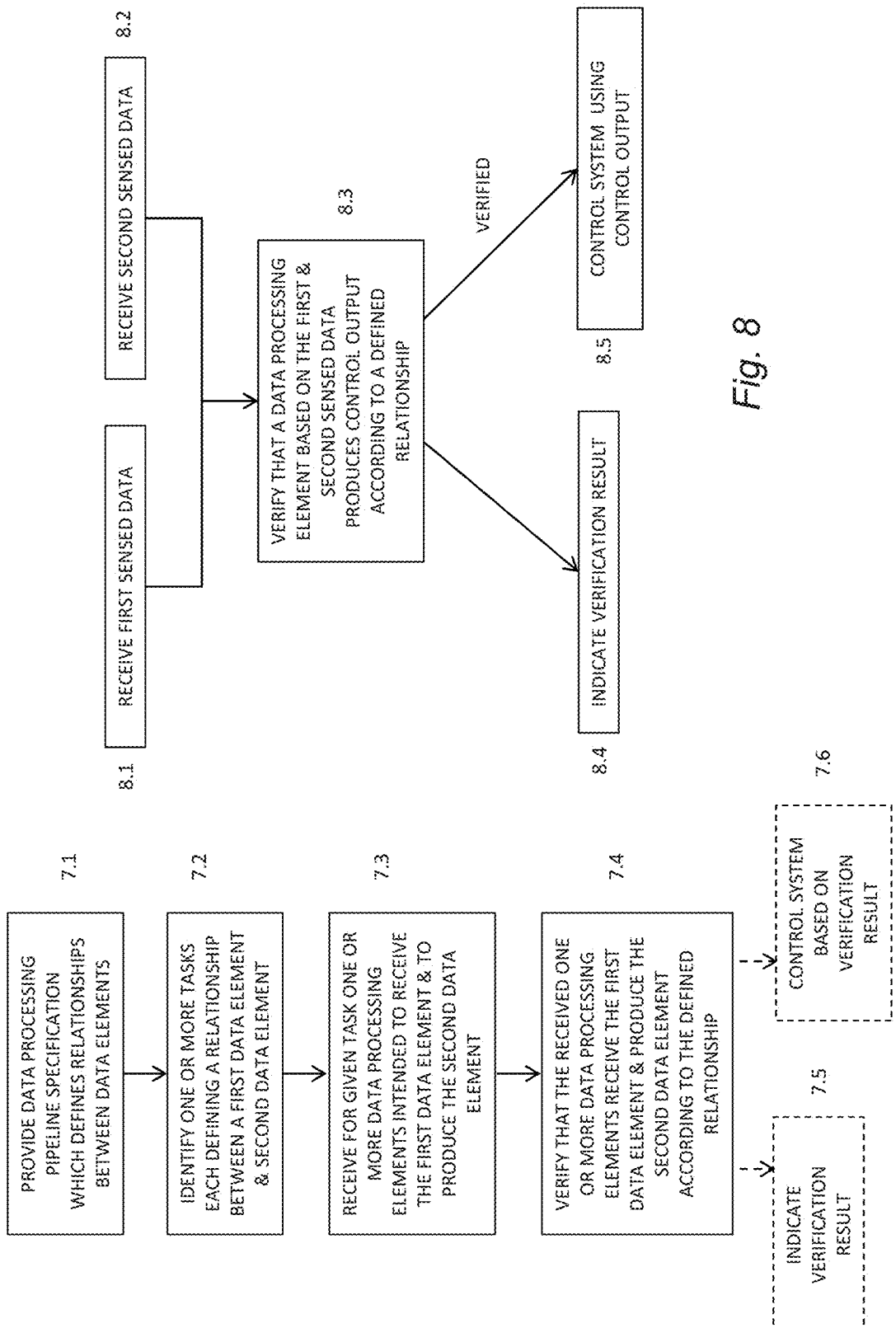

PIPELINE TASK VERIFICATION FOR A DATA PROCESSING PLATFORM

CROSS-REFERENCE TO RELATED APPLICATION

The present application is a continuation of U.S. application Ser. No. 17/937,097, filed Sep. 30, 2022, which is a continuation of U.S. application Ser. No. 17/106,748, filed Nov. 30, 2020, now U.S. Pat. No. 11,467,871, which is a continuation of U.S. application Ser. No. 16/218,872, filed Dec. 13, 2018, now U.S. Pat. No. 10,884,798, which claims the benefit of priority to foreign (GB) Application No. 1720823.2, filed Dec. 14, 2017, the entire disclosure of which is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57.

TECHNICAL FIELD

The present disclosure relates to a method and systems for pipeline task verification for a data processing platform.

BACKGROUND

Cloud computing is a computing infrastructure for enabling ubiquitous access to shared pools of servers, storage, computer networks, applications and other data resources, which can be rapidly provisioned, often over the Internet.

A data resource in this context is any form of executable software or data structure, usually but not exclusively for providing a service (and hence may be referred to as a data or software service) for example a data analysis application, a data transformation application, a report generating application, a machine learning process, a spreadsheet or a database.

Some companies provide cloud computing services for registered customers, for example manufacturing and technology companies, to create, store, manage and execute their own data resources. Sometimes, these data resources may interact with other software resources, for example those provided by the cloud platform provider. Certain data resources may be used to control external systems.

When creating a data resource, particularly a complex one, a data processing pipeline may be used to plan and manage different tasks and their dependencies, for example so that someone working on a downstream task knows they are dependent on the output of an upstream task, and sometimes more than one upstream task. Pipelines may be fairly large and complex. Where data processing pipelines are being created, modified or otherwise worked on, there are potentially a large number of developers or engineers accessing and modifying certain parts of the pipeline, possibly simultaneously, and possibly at different times. This can create significant technical issues if the developers or engineers produce some aspect of a task, e.g. a data processing operation on two tabular datasets, which does not conform for example to the expected dependencies or other part of the pipeline specification, which may itself change over time. This requires developers and engineers to constantly refer to the overall pipeline specification, which can be time-consuming and error-prone.

Further, if the output of a data processing pipeline is used to control some other system, for example an electrical system, then the control may fail or produce unwanted results.

SUMMARY

A first aspect provides a method of task validation in a software platform, wherein the method is performed using one or more processors, the method comprising:

providing a data processing pipeline specification, wherein the data processing pipeline specification defines a plurality of data elements of a data processing pipeline;

identifying from the data processing pipeline specification one or more tasks defining or having a defined relationship between a first data element and a second data element;

receiving for a given task one or more data processing elements intended to receive the first data element and to produce the second data element; and verifying that the received one or more data processing elements receive the first data element and produce the second data element according to the defined relationship.

The data processing pipeline specification may define pipeline dependencies of the plurality of data elements from which the one or more tasks may be identified.

The one or more tasks may comprise metadata defining the relationship between the first data element and the second data element of the task.

The metadata may define expected criteria for the one or more data processing elements and wherein the verification is based on whether the received one or more data processing elements agree with the expected criteria.

The metadata may comprise one or more of: expected dependencies of the one or more tasks; an expected language or transformation; and expected row and/or column names.

The data processing pipeline specification may be provided by means of a graphical user interface receiving user-defined placeholders representing one or more of data elements and tasks with a graphical indication of dependencies between data elements and/or tasks.

The one or more data elements and/or tasks may be user selectable to open an interface therefor, for receiving code or one or more links to code for performing one or more operations.

The method may further comprise providing on the graphical user interface a graphical indication of the verification result.

The graphical indication of the verification result may be positioned in or adjacent a placeholder associated with the verification operation.

The method may further comprise providing on the graphical user interface an indication of the reason for a verification failure.

The indication of the reason for a verification failure may be made responsive to a user hovering over, or selecting a placeholder associated with the verification operation.

The method may further comprise providing an indication of the expected criteria.

At least some of the metadata may be automatically inferred based on the user defined graphical identification of dependencies.

The method may further comprise controlling an electrical system based on the verification.

At least one of the data elements may be a first data set representing sensed data from one or more sensors, wherein the data processing element may produce a second data set from the first data set, and wherein a positive verification controls the electrical system to perform a predetermined operation.

A second aspect provides a computer program, optionally stored on a non-transitory computer readable medium program which, when executed by one or more processors of a data processing apparatus, causes the data processing apparatus to carry out a method according to any preceding method definition.

A third aspect provides an apparatus configured to carry out a method according to any of preceding method definition, the apparatus comprising one or more processors or special-purpose computing hardware.

BRIEF DESCRIPTION OF THE DRAWINGS

Example embodiments will now be described by way of non-limiting example with reference to the accompanying drawings, in which:

FIG. 5 is an example screenshot of a task creation window, according to embodiments;

FIG. 7 is a flow diagram showing processing operations performed by the pipeline management tool according to embodiments;

FIG. 8 is a flow diagram showing processing operations performed by the pipeline management tool according to embodiments.

DETAILED DESCRIPTION

Figure 1:
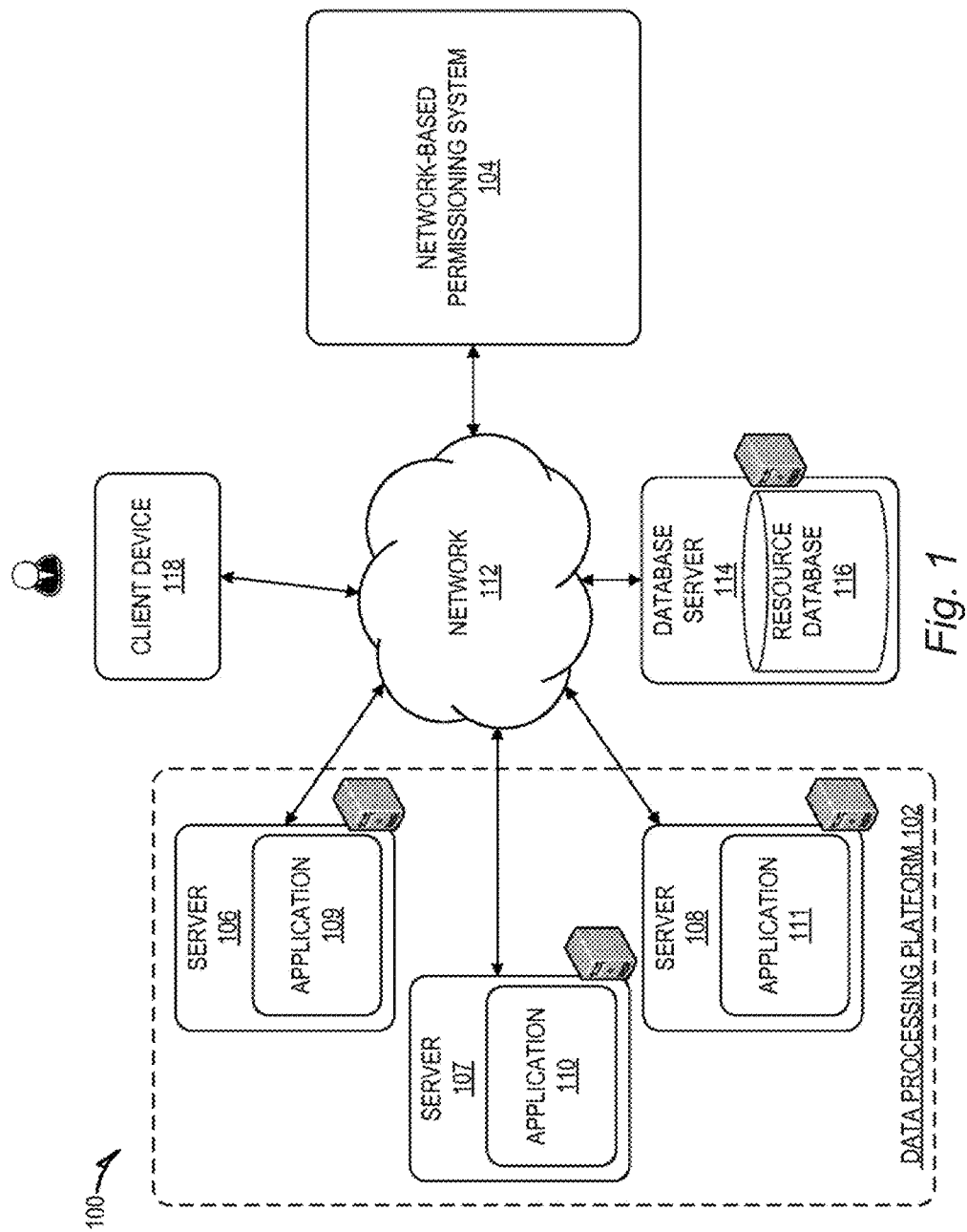
FIG. 1 is a block diagram illustrating a network system comprising a group of application servers of a data processing platform according to embodiments of this specification.

Embodiments herein relate to data processing pipelines, and particularly methods and systems for verification of data processing pipelines using a tool, which may be provided in software, hardware, firmware, or a combination thereof. In particular, the tool may enable users to create, plan and manage pipelines through a user interface that provides placeholders associated with tasks, or part of a task, which take data and convert the data into a different form, e.g. through a transformation or more complex processing operation. The pipeline may be defined by a pipeline specification which sets out the attributes, conditions and/or relationships between the tasks represented by the placeholders. The language used for certain tasks may form part of the specification. The attributes, conditions and/or relationships may be defined in metadata associated with one or more placeholders. Validation may be performed by a module which periodically runs to ensure that the specification is adhered to and flags through indicators when verification fails for one or more tasks.

In the context of the following, the following definitions apply.

A data processing pipeline is a set of data elements connected in series, where the output of a first element is the input of a second element. One or more other data elements may be connected to the input of the first or second elements. Some data elements may be performed in parallel, at least partially. Some data elements may perform a task or a part of a larger task when combined with others.

Certain data elements may be data sets, which may be raw data or processed data. In this case, the data sets may be represented in any suitable form, for example as database tables comprising one or more rows and columns. The data sets may represent technical data, e.g. data representing sensed or measured data from physical sensors in an industrial setting or of a machine such as vehicle or craft. The data sets may represent inventory data. The data sets may represent pixels of an image. The data sets may represent financial data. Many other examples of what the data sets represent are envisaged.

Certain data elements may relate to tasks, or part of a larger task, which define a relationship between at least a first data element and a second data element, for example between one or more input data elements and one or more output data elements. The tasks may be performed using data processing elements, to be mentioned below, and may involve transforming the data in some way to achieve the defined relationship.

A data processing pipeline is fundamentally used to structure workflows done on complex tasks that may have dependencies, e.g. the data from an industrial sensor may be required before a further task is performed, although this may not be essential.

Data processing elements for performing tasks, or part of a larger task, may perform a relatively simple operation, such as removing certain types of data from a received data element, e.g. a particular column and/or row from a received table, combining two or more received tables or certain rows and/or columns thereof, performing a unit conversion operation on data to produce other data in the same units, shifting data and so on. Data processing elements may also perform more complex tasks by receiving or being applying user inputted code, such as Java, Python, or structured query language (SQL), for example to run a program of computer-readable instructions for transforming the one or more received data elements into a different form or to produce the result of a combination or calculation. Data processing elements may be executed in series, in parallel or in time-sliced fashion possibly with buffer storage between elements.

A data processing pipeline specification is a data representation of the data processing pipeline, for example for defining the workflow in a visual way on a user interface. The data processing pipeline specification is effectively a digital document defining placeholders for data elements, whether raw data sets, derived data sets, transformed data sets, tasks, data processing elements etc., and their upstream and/or downstream dependencies. The data processing pipeline specification may be interactive. For example, the data processing pipeline may be presented on a graphical user interface (GUI) as a navigable set of placeholders, representing data elements, and connections between data elements representing dependencies using, for example, arrows. The direction of the arrows may indicate the required or expected flow of data from one placeholder to another. The placeholders may be squares, rectangles or circles. The placeholders and dependency indicators may be planned, created, managed, edited, viewed and/or executed from within a data processing pipeline management tool (hereafter "pipeline management tool.") The pipeline management tool may provide placeholders and dependency indicators that may be dragged and dropped at, or between, other placeholders to change dependencies which may automatically update attributes of the data processing pipeline specification.

A placeholder is a visual representation of a data element, which may comprise underlying attributes of the data element stored in an associated file. Each placeholder may have an indication of what it represents. The indication may be by means of a respective visual indicator for different data element types, e.g. raw data, task, transform etc., which may be by means of alphanumeric text, colour, shading, a graphical pattern or a combination thereof. A label indicating what the placeholder represents may also be indicated using one of these methods. For one or more of the data elements, the specification may define attributes, such as one or more of the upstream and/or downstream dependencies of the data element, one or more permitted programming languages (if a data processing element for receiving code), row and/or column names etc. These may be provided as metadata in association with each data element.

A data processing platform is any computing platform on which executable code, or software, may be executed, providing particular functionality and restrictions, in that low-level functionality is provided which the executable code needs to conform to.

A data resource is any form of executable software, data set, or data structure usually, but not exclusively for providing a service, for example a data analysis application, a data transformation application, a report generating application, a machine learning process, a spreadsheet or a database. A data resource may be created, viewed and/or edited or executed via a data processing pipeline management tool, which embodiments to be described later on relate to.

A data repository is any form of data storage entity into which data is specifically partitioned or isolated.

An execution environment is any representation of an execution platform, such as an operating system or a database management system.

A dataset, sometimes used interchangeably with data; a dataset holds data on the data processing platform, and usually has an accompanying schema for the dataset in order to make sense, or interpret, the data within the dataset.

The data processing platform may be an enterprise software platform associated with an enterprise platform provider. An enterprise software platform enables use by multiple users, internal and external to the enterprise platform provider. The users may be users of different respective organisations, such as different commercial companies.

The data resources stored on the software platform, and which may be planned, created, managed, edited, viewed and/or executed using the pipeline management tool, may relate to technical data and/or technical processes.

For example, in a financial organisation, it may be required to identify a list of suspicious customers by processing raw accounts, transactions and customer data in a particular order in order first to provide clean versions of the raw datasets (removing unwanted or unnecessary fields of the datasets to make data processing more efficient) and then to identify suspicious transactions which may for example be above a certain monetary amount. By correlating customer data with the suspicious transactions data, suspicious customers may be identified. This is given by way of a simple example, and will be explained further in relation to one of the embodiments below.

In another example, the pipeline management tool may be implemented as part of a control system for controlling an industrial or machine process.

For example, an engine manufacturer may create and store a database relating to spare parts for the different models of engines it produces and services. The database may, for example, be a multi-dimensional relational database. Certain analyses may be performed on the database using another application, for example an executable application resource for analysing and/or transforming the data in order to identify trends which may be useful for predicting when certain parts will fail and/or need.

For this purpose, the software platform may comprise enterprise applications for machine-analysis of data resources. For example, an organisation may store on the software platform history data for a machine and use an enterprise application for the processing of history data for the machine in order to determine the probability, or a risk score, of the machine, or a component sub-system of the machine, experiencing a fault during a future interval. The enterprise application may use the fault probabilities or risk scores determined for a machine to select a preventative maintenance task which can reduce the probability and/or severity of the machine experiencing a fault. History data for a machine may include sensor logs, a sensor log being multiple measurements of physical parameters captured by a sensor and relating to different points in time (a time series). History data for a machine may also include computer readable logs such as maintenance logs, fault logs and message logs corresponding to a machine. The maintenance log corresponding to the machine may record information such as dates and locations of prior maintenance tasks, details of replacement parts, free text notes made by an engineer or mechanic performing a maintenance task and so forth. The fault log corresponding to the machine may record information such as dates and locations of faults, the types of faults, the period of time required to rectify each fault and so forth. The message log corresponding to a machine, such as a ship or construction machinery, may records messages generated by controllers, processors or similar devices which are integrated into the component sub-systems of the machine. The messages may include a date and time, an identifier of a component sub-system, and message content such as, for example, warning information of information identifying a fault.

In another example, the pipeline management tool may be implemented as part of a control system for controlling part of a vehicle.

For example, the pipeline management tool may implement an antilock braking system (ABS) for a vehicle, taking braking power from updated sensed data in one data set and engine power from updated sensed data in another data set. A conversion on one or more of the data sets may be performed and code run to calculate the time-to-brake for input to the ABS system.

Other examples are envisaged and the above applications are mentioned by way of example.

The data processing platform on which the data resources are stored and executed may be a proprietary or open source platform, which offers advantages in terms of time-to-deploy on the platform provider's hardware, as well as offering partitioning of data and rolling upgrades. This may be particularly suited for automated deployment, scaling and management of applications. Such software platforms may employ containerised data resources.

In this regard, a containerised data resource comprises "containers" which hold one or more applications, and associated data libraries, that are guaranteed to be co-located on the same host machine and which can share resources.

Such software platforms may also provide a set of primitives which collectively provide mechanisms for deploying, maintaining and scaling applications. A basic scheduling unit may be called a pod. A pod may consist of one or more containers.

FIG. 1 is a network diagram depicting a network system 100 comprising a data processing platform 102 in communication with a network-based permissioning system 104 (hereafter "permissioning system") configured for registering and evaluating access permissions for data resources to which a group of application servers 106-108 share common access, according to an example embodiment. Consistent with some embodiments, the network system 100 may employ a client-server architecture, though the present subject matter is, of course, not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed.

The data processing platform 102 includes a group of application servers, specifically, servers 106-108, which host network applications 109-111, respectively. The network applications 109-111 hosted by the data processing platform 102 may collectively compose an application suite that provides users of the network system 100 with a set of related, although independent, functionalities that are accessible by a common interface. For example, the network applications 109-111 may compose a suite of software application tools that can be used to analyse data to develop various insights about the data, and visualize various metrics associated with the data. To further this example, the network application 109 may be used to analyse data to develop particular metrics with respect to information included therein, while the network application 110 may be used to render graphical representations of such metrics. It shall be appreciated that although FIG. 1 illustrates the data processing platform 102 as including a particular number of servers, the subject matter disclosed herein is not limited to any particular number of servers and in other embodiments, fewer or additional servers and applications may be included.

The applications 109-111 may be associated with a first organisation. One or more other applications (not shown) may be associated with a second, different organisation. These other applications may be provided on one or more of the application servers 106, 107, 108 which need not be specific to a particular organisation. Where two or more applications are provided on a common server 106-108 (or host), they may be containerised which as mentioned above enables them to share common functions.

Each of the servers 106-108 may in communication with the network-based permissioning system 104 over a network 112 (e.g. the Internet or an intranet). Each of the servers 106-108 are further shown to be in communication with a database server 114 that facilitates access to a resource database 116 over the network 112, though in other embodiments, the servers 106-108 may access the resource database 116 directly, without the need for a separate database server 114. The resource database 116 may stores other data resources that may be used by any one of the applications 109-111 hosted by the data processing platform 102.

In other embodiments, one or more of the database server 114 and the network-based permissioning system 104 may be local to the data processing platform 102; that is, they may be stored in the same location or even on the same server or host as the network applications 109, 110, 111.

As shown, the network system 100 also includes a client device 118 in communication with the data processing platform 102 and the network-based permissioning system 104 over the network 106. The client device 118 communicates and exchanges data with the data processing platform 102.

The client device 118 may be any of a variety of types of devices that include at least a display, a processor, and communication capabilities that provide access to the network 106 (e.g., a smart phone, a tablet computer, a personal digital assistant (PDA), a personal navigation device (PND), a handheld computer, a desktop computer, a laptop or netbook, or a wearable computing device), and may be operated by a user (e.g., a person) to exchange data with other components of the network system 100 that pertains to various functions and aspects associated with the network system 100 and its users. The data exchanged between the client device 118 and the data processing platform 102 involve user-selected functions available through one or more user interfaces (UIs). The UIs may be specifically associated with a web client (e.g., a browser) or an application 109-111 executing on the client device 118 that is in communication with the data processing platform 102. For example, the network-based permissioning system 104 provides user interfaces to a user of the client device 118 (e.g., by communicating a set of computer-readable instructions to the client device 118 that cause the client device 118 to display the user interfaces) that allow the user to register policies associated with data resources stored in the resource database 116.

Figure 2:
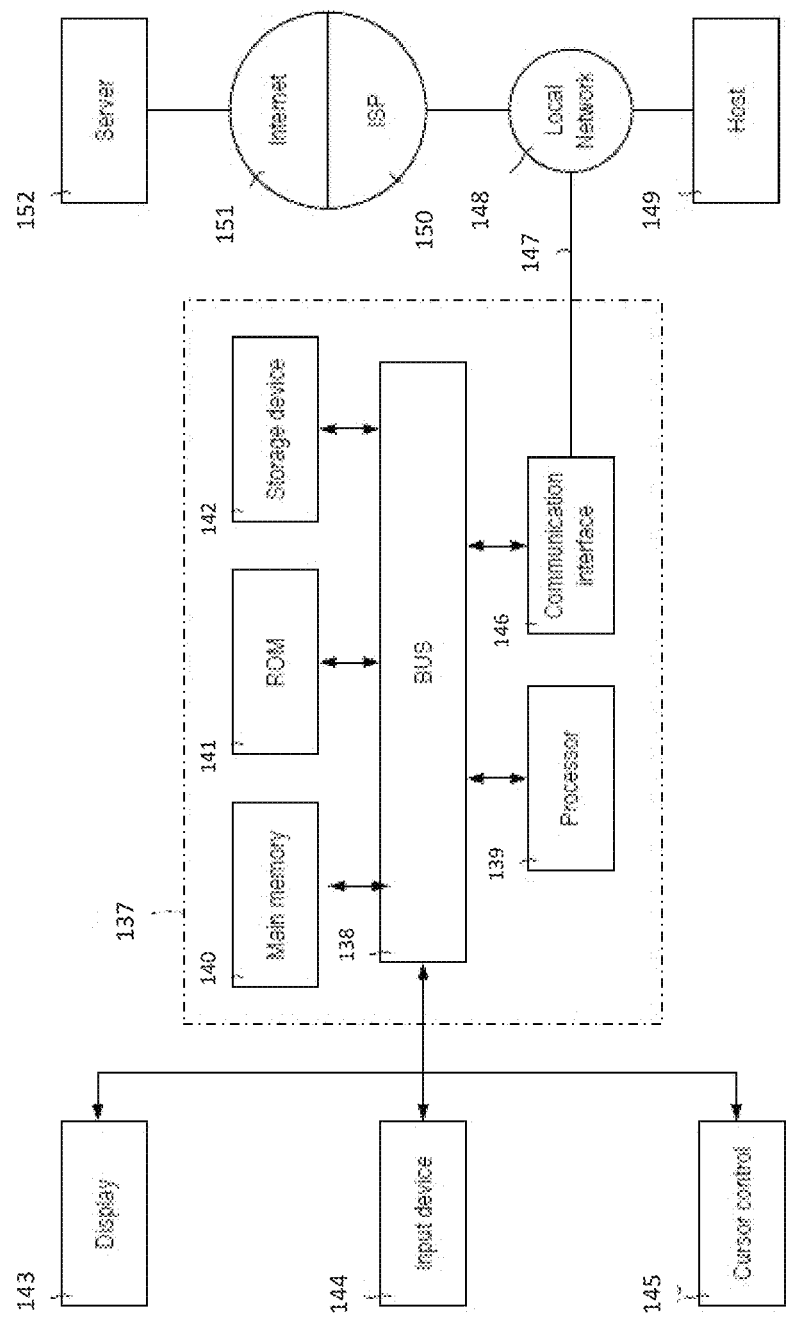
FIG. 2 is a block diagram of a computer system according to embodiments of this specification.

Referring to FIG. 2, a block diagram of an exemplary computer system 137, which may comprise the data processing platform 102, one or more of the servers 106-108, the database server 114 and/or the network-based permissioning system 104, consistent with examples of the present specification is shown.

Computer system 137 includes a bus 138 or other communication mechanism for communicating information, and a hardware processor 139 coupled with bus 138 for processing information. Hardware processor 139 can be, for example, a general purpose microprocessor. Hardware processor 139 comprises electrical circuitry.

Computer system 137 includes a main memory 140, such as a random access memory (RAM) or other dynamic storage device, which is coupled to the bus 138 for storing information and instructions to be executed by processor 139. The main memory 140 can also be used for storing temporary variables or other intermediate information during execution of instructions by the processor 139. Such instructions, when stored in non-transitory storage media accessible to the processor 139, render the computer system 137 into a special-purpose machine that is customized to perform the operations specified in the instructions.

Computer system 137 further includes a read only memory (ROM) 141 or other static storage device coupled to the bus 138 for storing static information and instructions for the processor1 139. A storage device 142, such as a magnetic disk or optical disk, is provided and coupled to the bus 138 for storing information and instructions.

Computer system 137 can be coupled via the bus 138 to a display 143, such as a cathode ray tube (CRT), liquid crystal display, or touch screen, for displaying information to a user. An input device 144, including alphanumeric and other keys, is coupled to the bus 138 for communicating information and command selections to the processor 139. Another type of user input device is cursor control 145, for example using a mouse, a trackball, or cursor direction keys for communicating direction information and command selections to the processor 139 and for controlling cursor movement on the display 143. The input device typically has two degrees of freedom in two axes, a first axis (for example, x) and a second axis (for example, y), that allows the device to specify positions in a plane.

Computer system 137 can implement the techniques described herein using customized hard-wired logic, one or more ASICs or FPGAs, firmware and/or program logic which in combination with the computer system causes or programs computer system 137 to be a special-purpose machine. According to some embodiments, the operations, functionalities, and techniques disclosed herein are performed by computer system 137 in response to the processor 139 executing one or more sequences of one or more instructions contained in the main memory 140. Such instructions can be read into the main memory 40 from another storage medium, such as storage device 142. Execution of the sequences of instructions contained in main memory 140 causes the processor 139 to perform the process steps described herein. In alternative embodiments, hard-wired circuitry can be used in place of or in combination with software instructions.

The term "storage media" as used herein refers to any non-transitory media that stores data and/or instructions that cause a machine to operate in a specific fashion. Such storage media can comprise non-volatile media and/or volatile media. Non-volatile media includes, for example, optical or magnetic disks, such as storage device 142. Volatile media includes dynamic memory, such as main memory 140. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fibre optics, including the wires that comprise bus 138. Transmission media can also take the form of acoustic or light waves, such as those generated during radio-wave and infra-red data communications.

Various forms of media can be involved in carrying one or more sequences of one or more instructions to processor 139 for execution. For example, the instructions can initially be carried on a magnetic disk or solid state drive of a remote computer. The remote computer can load the instructions into its dynamic memory and send the instructions over a telephone line or other transmission medium using a modem. A modem local to computer system 137 can receive the data on the telephone line or other transmission medium and use an infra-red transmitter to convert the data to an infra-red signal. An infra-red detector can receive the data carried in the infra-red signal and appropriate circuitry can place the data on bus 138. Bus 138 carries the data to the main memory 140, from which the processor 139 retrieves and executes the instructions. The instructions received by the main memory 140 can optionally be stored on the storage device 142 either before or after execution by the processor 139.

Computer system 137 also includes a communication interface 146 coupled to the bus 138. The communication interface 146 provides a two-way data communication coupling to a network link 147 that is connected to a local network 148. For example, the communication interface 146 can be an integrated services digital network (ISDN) card, cable modem, satellite modem, or a modem to provide a data communication connection to a corresponding type of telephone line. As another example, the communication interface 146 can be a local area network (LAN) card to provide a data communication connection to a compatible LAN. Wireless links can also be implemented. In any such implementation, the communication interface 146 sends and receives electrical, electromagnetic or optical signals that carry digital data streams representing various types of information.

The network link 147 typically provides data communication through one or more networks to other data devices. For example, the network link 147 can provide a connection through the local network 148 to a host computer 149 or to data equipment operated by an Internet Service Provider (ISP) 150. The ISP 150 in turn provides data communication services through the world wide packet data communication network now commonly referred to as the "Internet" 151. The local network 148 and internet 151 both use electrical, electromagnetic or optical signals that carry digital data streams. The signals through the various networks and the signals on the network link 147 and through the communication interface 146, which carry the digital data to and from the computer system 137, are example forms of transmission media.

The computer system 137 can send messages and receive data, including program code, through the network(s), network link 147 and communication interface 146. For example, a first application server 106 may transmit data through the local network 148 to a different application server 107, 108.

The data processing platform 102 may be a containerised data processing platform.

In this regard, a containerised data platform comprises "containers" which hold one or more applications, and associated data libraries, that are guaranteed to be co-located on the same host machine and which can share resources. Such software platforms may also provide a set of primitives which collectively provide mechanisms for deploying, maintaining and scaling applications. A basic scheduling unit may be called a pod. A pod may consist of one or more containers.

In accordance with an example embodiment, one or more of the application servers 106, 107, 108 in the data processing platform 102 shown in FIG. 1 comprises a pipeline management tool 170 (refer to FIG. 3) which may be operated by one or more users to plan, view, edit and in some cases execute a data processing pipeline which itself may be implemented on the one or more application servers, or any other system connected to, or associated with, the data processing platform 102.

Embodiments herein provide methods, systems and computer-implemented code or software for providing the pipeline management tool, within which a pipeline specification may be planned, created, managed, edited, viewed and/or executed by means of selecting one or more placeholders, which may be effective to open within the user interface another window which displays the attributes, including for example the name of the placeholder, what it represents, and the metadata. Where the metadata defines in some way the form of expected input and/or output data, or the language used in a data processing operation, for example, then verifications can be performed using a verification software module based on the metadata to ensure that it complies with the expectations and those of dependent data elements.

Within the, or another window, a data processing element may be entered or linked-to. That is, computer-readable code or a transformation may be entered or linked-to by selecting or opening a placeholder and inputting code or a link to code, for example a path name to some other part of a data processing platform.

This enables verification to be performed by the verification module such that errors may be highlighted within the user interface to indicate where there are potential problems, for example if a placeholder expects data from an upstream placeholder in a different format or if received code is in a different language.

Errors may be indicated in any suitable way, for example by showing a YES or NO or a tick or cross in, or adjacent, the relevant one or more placeholders.

The presence of an error may affect a downstream control operation in some embodiments, for example by issuing a warning light in a vehicle or craft or in an industrial setting, or by halting some system operation.

Figure 3:
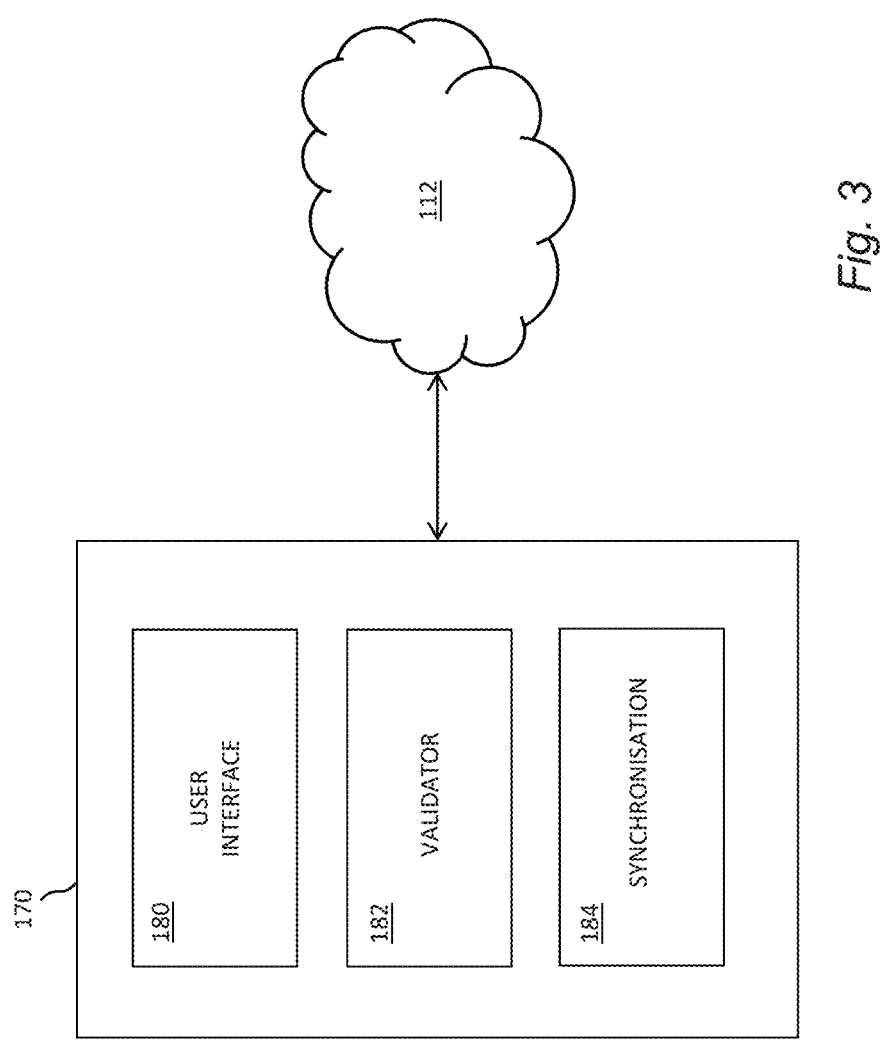
FIG. 3 is a schematic diagram of a pipeline management tool according to embodiments.

Referring now to FIG. 3, in one embodiment the pipeline management tool 170 comprises three modules, namely a user interface module 180, a validator module 182 and a synchronisation module 184. A greater or lesser number of modules may be provided in some embodiments.

The user interface module 180 provides a GUI for interactive display on a user computer terminal. The GUI may comprise one or more graphical windows for displaying information, including a pipeline specification in graphical form by using placeholders.

The validator module 182 performs a validation on identified tasks within the pipeline specification to ensure that received data processing modules, which may be code or transformations or metadata, agree with one or more predetermined relationships defined for tasks within the specification. The validator module 182 may generate a binary result which may be for each placeholder or a subset of the placeholders to indicate where validation has been successful or not. This validation result may be provided in a graphical manner, for example using a tick graphic to indicate a successful validation on a task placeholder and a cross to indicate an unsuccessful validation requiring attention and/or correction.

The synchronisation module 184 synchronises the pipeline management tool 170 with data which may be stored on any of the application servers 106, 107, 108 of the data processing platform 102, or even in the resource database 116 of the database server 114, via the network 112 to reflect changes made to datasets so that the pipeline specification reflects substantially the current state of the data.

Figure 4:
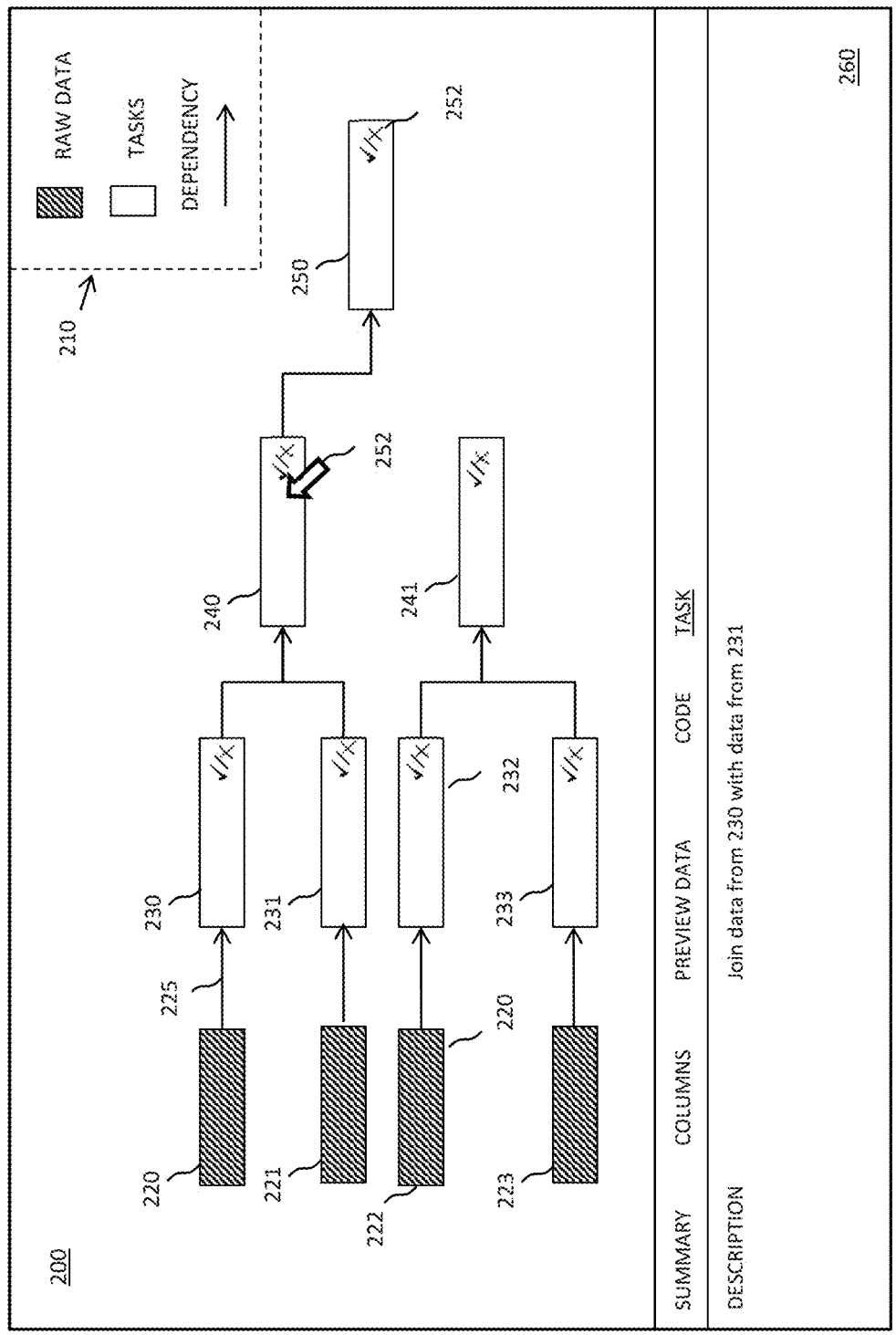
FIG. 4 is an example screenshot of the pipeline management tool graphical user interface, according to embodiments.

FIG. 4 is an example screenshot of the GUI 200 of the pipeline management tool 170. The GUI 200 comprises a legend 210 indicating types of placeholder, and various placeholders which have been placed within a main part or window of the GUI in planning and creating an example data processing pipeline. Each of the rectangular boxes represents a placeholder and arrows 225 indicate downstream or upstream dependencies. A user may use a mouse pointer or touch screen interface to select new placeholders or dependencies and may drag the selected item onto the appropriate part of the GUI 200 whereby further options may be automatically presented. Moving a placeholder close to another placeholder, within a predetermined distance, may cause a dependency to be automatically created between the two placeholders, for example. The dependency may be manually deleted or modified thereafter.

For example, in an example pipeline indicated in the specification GUI 200, a first set of placeholders 220-223 may represent raw datasets stored in the resource database 116. The first placeholder 220 may represent raw accounts data, the second placeholder 221 may represent raw transactions data, the third placeholder 222 may represent raw customer data and the fourth placeholder 223 may represent raw address data for the customer data. Attributes of these placeholders 220-223 may point to appropriate datasets stored as tables in the resource database 116.

For example, fifth to eighth placeholders 230-233 may represent tasks to be performed on the respective data sets from the first to fourth placeholders 220-223. The tasks may involve providing 'clean' datasets by removing unwanted columns from the respective raw data sets represented by the first to fourth placeholders 220-223. The tasks represented by the further placeholders 230-233 may therefore involve one or more data processing elements which take the raw datasets as input and generate transformed datasets for output.

For example, a further placeholder 240 may represent a further task to be performed on the clean accounts and transactions data sets associated with the fifth and sixth placeholders 230, 231. This further placeholder 240 may represent a task which generates a further dataset table combining accounts with transactions.

For example a further placeholder 241 may represent a further task to be performed on the clean customer and address data sets associated with the seventh and eighth placeholders 232, 233. This further placeholder 241 may represent a task which generates a further dataset table combining customers with details.

For example, a further placeholder 250 may represent a still further task to be performed on the accounts with transactions task 240. This further placeholder 250 may represent a task which generates a further dataset table restricted to accounts with transactions above a predetermined monetary level, and producing a table of suspicious accounts.

Associated with each task placeholder 220-223, 230-233, 240, 241, 250 is shown a validation indicator 252. In this example, the validation indicator 252 is either a tick or a cross to respectively indicate a successful validation or unsuccessful validation result. The indication provides a rapid indication as to whether one or more task placeholders, by virtue of their dependency, language or column names attributes, fulfil one or more predetermined relationships based on the pipeline specification.

In some embodiments, one or more users or workers may be assigned to a task, e.g. using the user interface 180. A user (or worker) assignment may stipulate which user or users are required, expected or allowed to perform the task, and in this way it is possible through the user interface 180 (and even through the GUI 200 of the pipeline management tool 170) to assign certain users or workers to the task, thereby imposing access and/or editing restrictions to provide data security in a straightforward and intuitive way. Where a task is dependent on one or more other tasks, it may be that assignment of a user to one of the tasks automatically causes their assignment to the dependent task. This may be corrected in due course if not deemed appropriate. In some embodiments, a priority may be assigned to a task, e.g. to indicate its urgency or relative urgency to one or more other tasks. Where a task is dependent on one or more other tasks, it may be that assignment of a priority to one of the tasks automatically determines the priority of one or more other dependent tasks, or flags errors in inconsistencies. For example, assigning a first task as urgent, where an earlier, dependent task is non-urgent, may result in the earlier task automatically being updated to urgent. Such user or priority assignments may comprise attributes of respective tasks represented by the task placeholders 230-233, 240, 241, 250. In such cases, the validator module 182 may perform a validation on identified tasks within the pipeline specification to ensure that users involved with a particular task are allocated to that task, and/or that the task has been worked on with the appropriate priority, e.g. relative to another task, and/or that the priorities are consistent. The validation indicator 252 likewise may provide a rapid indication as to whether one or more task placeholders are valid.

Below the main GUI window 200 is a further window 260 which may display certain attributes of selected placeholders, for example the accounts with transactions placeholder 240 which is shown selected by means of the pointer 252. Upon selection, the user may select from within the further window 26o one or more attribute columns, including a summary of what the placeholder represents, the columns of the table, a preview of underlying or associated data, underlying code for performing the task, and a description of the task itself. In this case, the description tells us that this placeholder joins data from placeholders 230 and 231.

Referring now to FIG. 5, a further GUI window 270 is shown for creation of a new placeholder representing a task. An 'add new' graphic may be displayed in the FIG. 4 main GUI window 200 to enable the shown new placeholder window 270 to be displayed.

The new placeholder window 270 in some embodiments comprises a number of fields 272, 274, 276, 278, 279 for receiving user defined data.

For example, the new placeholder window 270 may be used to create a new placeholder for adding to the FIG. 4 pipeline example. We will call this "Suspicious_Customers" based on a join between the customers with details placeholder 241 and the suspicious accounts placeholder 250.

For example, a first field 272 may receive a description of the new placeholder, which may be any form of user-friendly way of understanding the role of the corresponding task.

For example, a second field 274 may receive dependencies of the new placeholder, which may be any form of path or link to the dependencies which, in this example, are the paths to placeholders 241, 250. These may be received automatically based on the positioning of a new placeholder in the FIG. 4 GUI 200 and adding dependency links from the said two placeholders 241, 250.

For example, a third field 276 may receive an indication of acceptable languages used for the task performed by the new placeholder. Here, we define that SQL, Python and Java are allowed.

For example, a fourth field 278 may receive the column names of a new, transformed table that the new task will generate.

For example, a fifth field 279 may receive data relating to column type(s), which may be useful for validating column types, e.g. using string, integer, date, etc.).

A greater or lesser number of fields may be provided.

The first to fourth fields 272, 274, 276, 278, 279 represent metadata types, and the data contained therein is metadata for the respective placeholder and the task it represents.

This metadata represents part of the pipeline specification for the present example. Particularly, for one or more tasks of the pipeline specification shown in FIG. 4, such metadata indicates an expected relationship between a first data element and another data element. For example, a relationship may be defined between datasets from one or more inputted data elements and a second data element, e.g. the data indicating the transform that the current task produces. The language is also considered part of the expected relationship because without the use of the correct or acceptable code, the relationship may not be realized.

Figure 6:
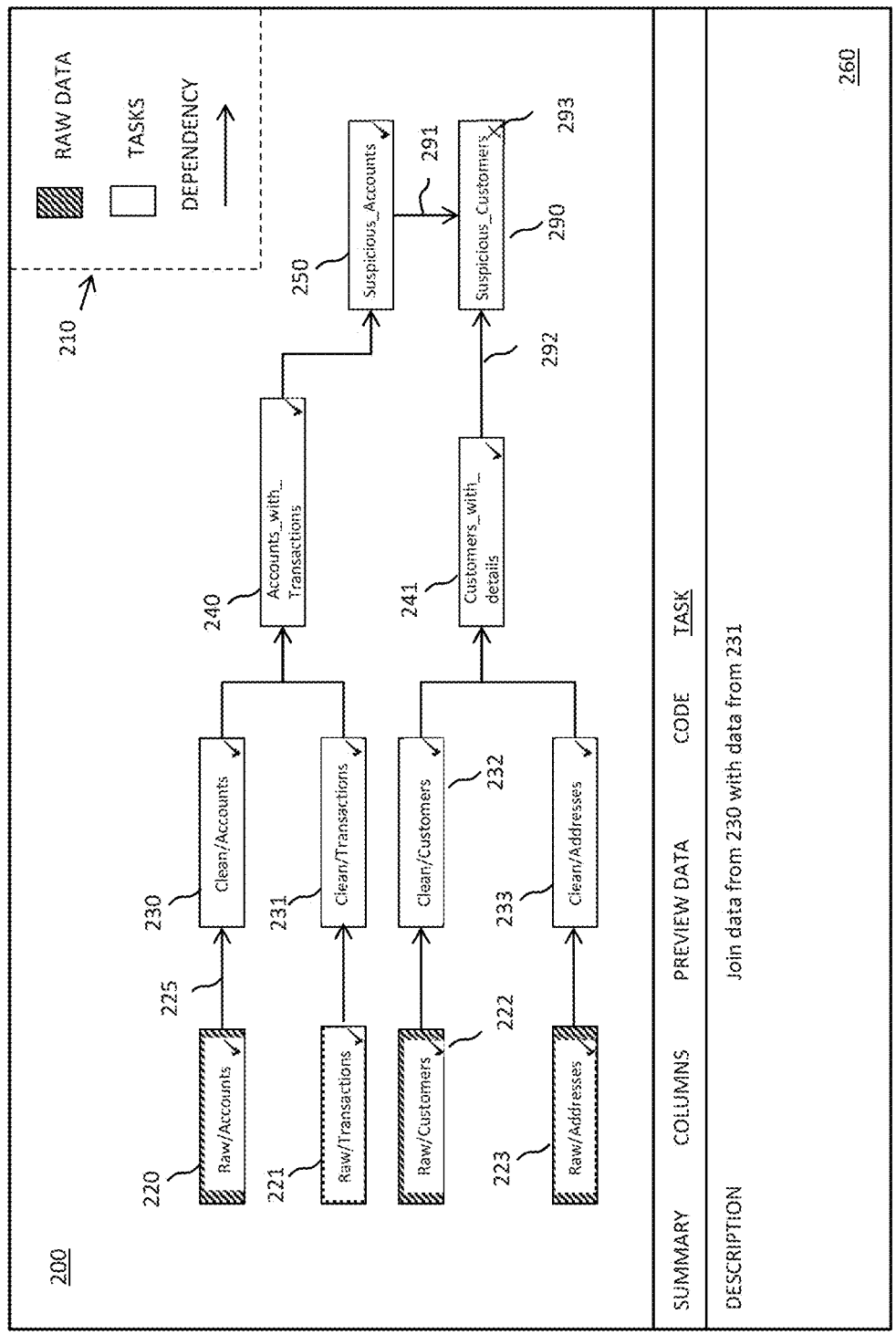
FIG. 6 is an updated example screenshot of the FIG. 4 screenshot subsequent to creation of a new task, according to embodiments.

FIG. 6 is similar to the FIG. 4 GUI 200 with the exception that a new placeholder 290 corresponding to the created Suspicious_Customers task is now shown as part of the pipeline specification. Arrows 291, 292 are added to indicate the dependencies.

In this example we assume that all task placeholders 220-223, 230-233, 240, 241, 250 have an associated set of metadata defining the relationship between a first data element and a second data element (which may be the current data element or a later data element.)

It will be appreciated that the placement of new tasks, or the use of data processing elements such as code or transforms to effect tasks, may or may not agree with the specification.

For example, a user may provide code for combining two datasets and/or for performing other processing tasks. This may relate to a particular placeholder, but if the code does not conform to the relationship defined in the metadata for the associated task, then problems may result. It may for example affect the downstream pipeline in a significant way.

For example, a user may provide code in a language that is not part of the language metadata for the task placeholder. In this case, the relationship defined by the pipeline specification will be invalid and the user may need a prompt informing him or her that the provided code is invalid.

For example, a user may provide code or a transform which requires input data from another table from which it does not depend.

For example, a user may provide code or a transform which produces output data in a format that does not agree with an upstream task requirement, e.g. with missing columns.

The validator module 182 in this context is configured in overview to monitor modifications made to tasks indicated in the pipeline specification, including new code or transforms, or changed code or transforms for a given task, i.e. data processing elements, and to identify if any of such received code or transforms do not comply or agree with what it is specified in the data pipeline specification. Individual ones of the placeholders corresponding to said received data processing elements, e.g. tasks, may be highlighted or otherwise indicated as valid or invalid.

If invalid, selection of the corresponding placeholder may be effective to cause an indication of the error and/or the expected language, column or dependency, to the user.

In overview, the operation of the pipeline management tool 170 is explained with reference to FIG. 7, which is a flow diagram indicating processing operations performed by the software tool when executed on a processor, for example using the system shown in FIG. 2.

It will be appreciated that certain operations may be omitted or reordered in some embodiments.

A first operation 7.1 may comprise providing a data processing pipeline specification, wherein the data processing pipeline specification defines a plurality of data elements of a data processing pipeline.

A second operation 7.1 may comprise identifying from the data processing pipeline specification one or more tasks defining or having a defined relationship between a first data element and a second data element.

A third operation 7.3 may comprise receiving for a given task one or more data processing elements intended to receive the first data element and to produce the second data element.

A fourth operation 7.4 may comprise verifying that the received one or more data processing elements receive the first data element and produce the second data element according to the defined relationship.

Certain other operations may be provided, which may be optional. For example, a fifth operation 7.5 may indicate the verification result 7.5 in a GUI. For example, a sixth operation 7.6, which may or may not be independent of the fifth operation, may control a system, such as an industrial process or machine, based on the verification result.

Taking the above example of the pipeline specification shown in FIG. 6, the validator 182 of the pipeline management tool 170 may identify the Suspicious_Customers placeholder 290 as a task using any one or more of the following examples.

For example, the validator 182 may identify one or more of (i) the fact that the placeholder 290 has been defined using a task type placeholder, (ii) it comprises dependency metadata indicating receipt of two or more dependencies as input and produces data therefrom, (iii) keywords appear in the description part to indicate some operation such as a transform or calculation is involved, (iv) that the received columns from upstream dependencies do not match output dependencies, and (v) other such flags or indicators that the placeholder represents a task involving code or a transform.

We may assume for example, that the validator 182 identifies that the Suspicious_Customers placeholder 290 is a task because it was created using the placeholder type=task. The validator 182 then, in response to receiving from a user new or updated code, or one or more transforms in (or linked to) this task, validates that received code or transform against the metadata defining the relationship for the task.

For example, it may validate that the received language is correct, i.e. is it SQL, Python or Java. If not, then it is invalid. For example, it may validate that the dependencies are correct, i.e. does the code receive data from these dependencies. For example, it may validate whether the produced columns agree with those indicated in the columns metadata, i.e. customer id, name and address. If one of these is missing, then it is invalid. In FIG. 6, an indicator 293 shows such an invalid indication to prompt remedial action, for example by issuing a readable validation report which indicates the nature of the error, and possibly what was expected, and possibly with a suggestion on how to rectify the error.

In some embodiments, where the verification fails and the error is a relatively minor one, rectification may be performed automatically.

In some embodiments, where the verification fails, the error indication may also be propagated to one or more downstream data elements, possibly in a different style, to warn users working on said downstream data elements that expected data may not be received based on the current state of the tasks.

In another embodiment, the pipeline verification may form part of a control system for an industrial process or machine, for example to control some aspect of its operation.

For example, FIG. 8 shows in flow diagram form example operations that may form part of operations 7.3, 7.4, 7.5 and 7.6 described above.

A first operation 8.1 may comprise receiving first sensed data into a first data set.

A second operation 8.2 may comprise receiving second sensed data into a second data set.

A third operation 8.3 may comprise verifying that a received data processing element (associated with a task for processing or transforming the first and second data sets in some way) generates control output according to a defined relationship indicated in the specification for such a pipeline.

A fourth operation 8.4 may comprise indicating the verification result.

A fifth operation 8.5 may comprise controlling a subsequent system, e.g. an industrial process or machine, using the control output.

Figure 9:
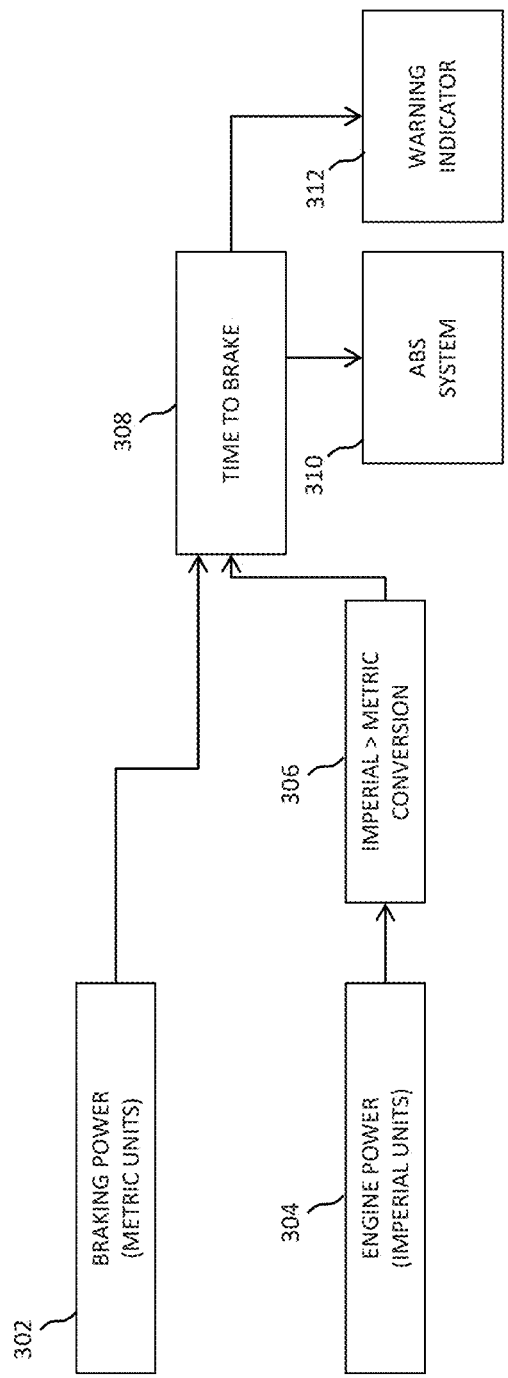
FIG. 9 is an example of a pipeline created by the pipeline management tool that may be used to control another system, according to embodiments.

A practical example of such a control pipeline is shown in FIG. 9, which represents controlling an antilock braking system (ABS) of a vehicle.

A first placeholder 302 represents braking power in metric units, and may comprise or receive a data set from one or more sensors of a vehicle representing the up-to-date braking power.

A second placeholder 304 represents engine power in imperial units, and may comprise or receive a data set from one or more sensors of the vehicle representing the up-to-date engine power.

A third placeholder 306 represents a task, being imperial to metric conversion, which may take code for converting imperial units to metric units for a subsequent calculation. The third placeholder 306 will be identifiable by the validator 182 as a task using any above method and may have associated metadata as explained above.

A fourth placeholder 308 represents the time to brake, i.e. when to cause application and removal of the vehicle's brakes for an ABS control system represented by placeholder 310. A further placeholder 312 represents a warning indicator for informing a driver of an error with the ABS control system. The fourth placeholder 308 is identifiable by the validator 182 as a task and may have associated metadata as explained above.

The validator 182 may run periodically during use of the vehicle to test received code in real-time. For example, if a system error or erroneous data were to be received by the time to brake task, represented by the fourth placeholder 308, not agreeing with its metadata, then the validator may cause some action on the ABS system and/or the warning indicator. For example, the validator 182 may switch off the ABS system and display the warning indicator.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computerized method, performed by a computing system having one or more hardware computer processors and one or more non-transitory computer readable storage device storing software instructions executable by the computing system to perform the computerized method comprising:

accessing a data processing pipeline specification, wherein the data processing pipeline specification defines a plurality of data elements of a data processing pipeline;

identifying from the data processing pipeline specification a task indicating a defined relationship between a first data element and a second data element, wherein the task is associated with metadata indicating an expected language or transformation, an expected dependency, or an expected row and/or column name;

determining, for the task, one or more data processing elements intended to receive the first data element and to produce the second data element; and verifying that the one or more data processing elements receive the first data element and produce the second data element according to the defined relationship.

2. The computerized method of claim 1, wherein the data processing pipeline specification defines pipeline dependencies of the plurality of data elements from which the task may be identified.

3. The computerized method of claim 2, wherein the metadata defines a relationship between the first data element and the second data element.

4. The computerized method of claim 3, wherein the metadata defines expected criteria for the one or more data processing elements.

5. The computerized method of claim 1, wherein the first data element is a first data set representing sensed data from one or more sensors, wherein the one or more data processing elements produce the second data element comprising a second data set from the first data set.

6. The computerized method of claim 1, further comprising:

receiving user input of the one or more data processing elements intended to receive the first data element and to produce the second data element according to the defined relationship; and accessing the first and second data elements from a data source.

7. The computerized method of claim 1, wherein the expected dependency is associated with the task or one more of the first and second data elements.

8. The computerized method of claim 1, wherein the verifying comprises analyzing the one or more data processing elements with reference to the metadata.

9. A computing system comprising:

a hardware computer processor;

a non-transitory computer-readable medium having software instructions stored thereon, the software instructions executable by the hardware computer processor to cause the computing system to perform operations comprising:

accessing a data processing pipeline specification, wherein the data processing pipeline specification defines a plurality of data elements of a data processing pipeline;

identifying from the data processing pipeline specification a task indicating a defined relationship between a first data element and a second data element, wherein the task is associated with metadata indicating an expected language or transformation, an expected dependency, or an expected row and/or column name;

determining, for the task, one or more data processing elements intended to receive the first data element and to produce the second data element; and verifying that the one or more data processing elements receive the first data element and produce the second data element according to the defined relationship.

10. The computing system of claim 9, wherein the data processing pipeline specification defines pipeline dependencies of the plurality of data elements from which the task may be identified.

11. The computing system of claim 10, wherein the metadata defines a relationship between the first data element and the second data element.

12. The computing system of claim 11, wherein the metadata defines expected criteria for the one or more data processing elements.

13. The computing system of claim 11, wherein the first data element is a first data set representing sensed data from one or more sensors, wherein the one or more data processing elements produce the second data element comprising a second data set from the first data set.

14. The computing system of claim 11, further comprising:
   receiving user input of the one or more data processing elements intended to receive the first data element and to produce the second data element according to the defined relationship; and
   accessing the first and second data elements from a data source.

15. The computing system of claim 9, wherein the expected dependency is associated with the task or one more of the first and second data elements.

16. The computing system of claim 9, wherein the verifying comprises analyzing the one or more data processing elements with reference to the metadata.

* * * * *